United States Patent [19]

Hawk

[11] 4,082,310
[45] Apr. 4, 1978

[54] LOW PROFILE VEHICLE HITCH

[75] Inventor: Dale Wyatt Hawk, Springfield, Ill.

[73] Assignee: Fiat-Allis Construction Machinery, Inc., Deerfield, Ill.

[21] Appl. No.: 745,084

[22] Filed: Nov. 26, 1976

[51] Int. Cl.$^2$ ............................................... B60D 1/00
[52] U.S. Cl. .................................................. 280/492
[58] Field of Search ................... 180/51, 52, 134, 135, 180/136, 137, 138, 139; 280/400, 433, 437, 492, 97, 423 R, 440

[56] References Cited

U.S. PATENT DOCUMENTS

| | | | |
|---|---|---|---|
| 1,983,317 | 12/1934 | Seitz | 280/440 |
| 2,401,036 | 5/1946 | Armington | 280/440 |
| 3,179,440 | 4/1965 | Bumby | 280/492 |

Primary Examiner—Joseph F. Peters, Jr.
Assistant Examiner—R. Schrecengost
Attorney, Agent, or Firm—August E. Roehrig, Jr.; Robert A. Brown; Harvey W. Rockwell

[57] ABSTRACT

A draft connection is disclosed for tractor and trailer units or similar articulated vehicles, which is characterized by a vertically disposed hitch pin mounted in the end portion of the trailer gooseneck and a cooperating bearing socket for receiving the pin which constitutes a part of an assembly mounted in the back portion of the frame of the tractor unit, which assembly includes an associated horizontal hitch pivot arrangement.

6 Claims, 3 Drawing Figures

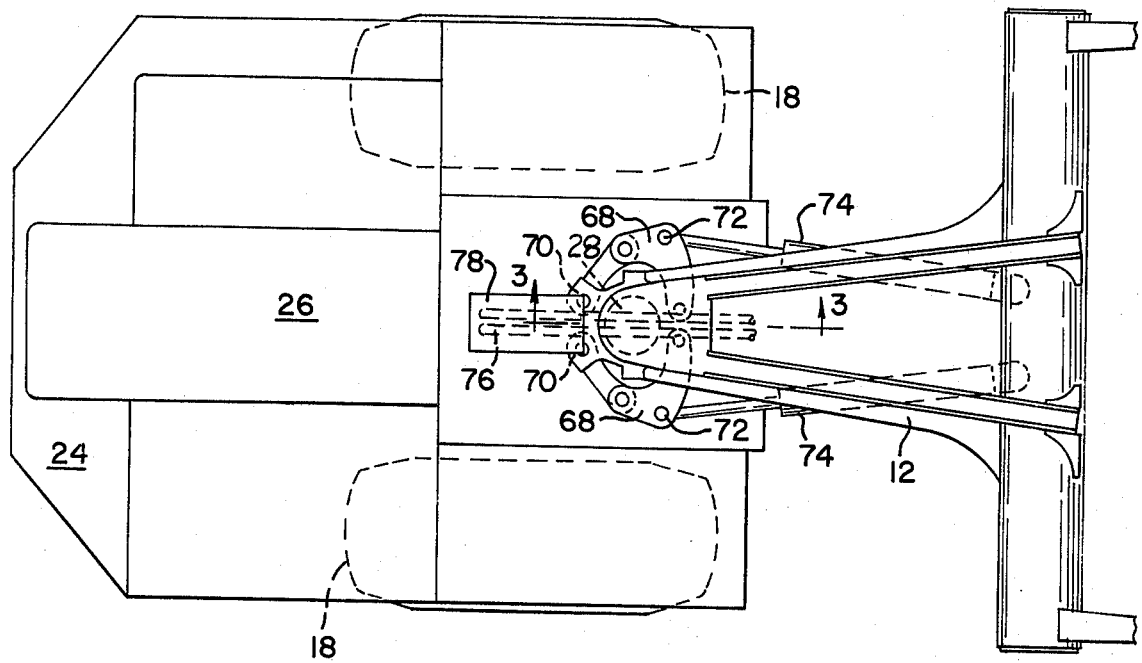
FIG-2-
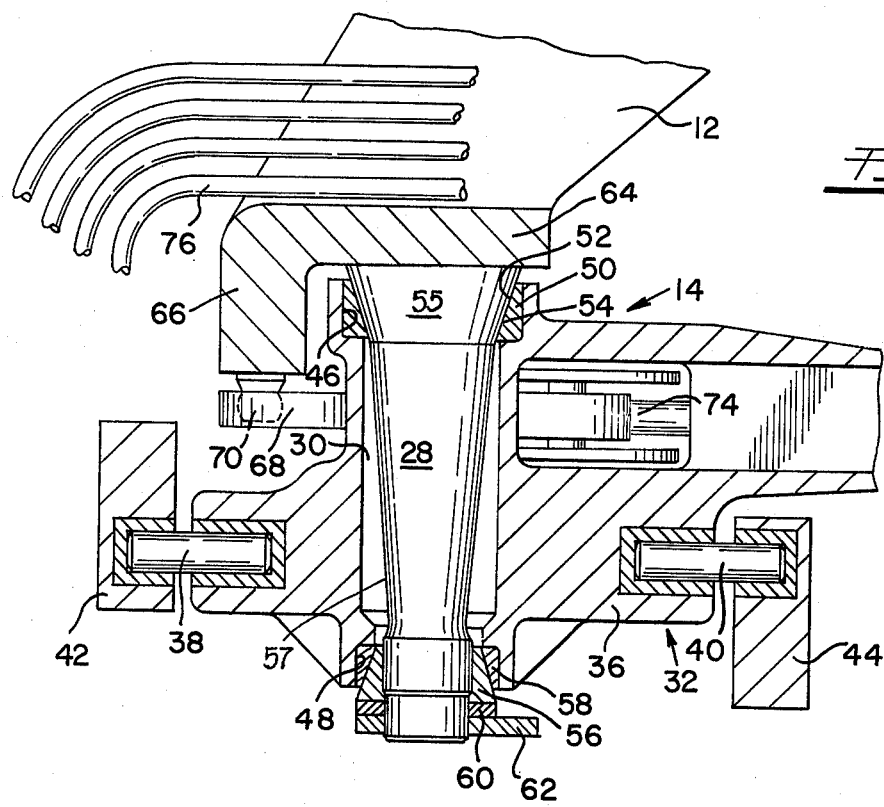
FIG-3-

LOW PROFILE VEHICLE HITCH

BACKGROUND OF THE INVENTION

This invention relates in general to articulated vehicles and, in particular, to improvements in a hitch construction for pivotally connecting a draft or tractor unit and a trailer unit so that there is adequate provision for angular movement of the units relative to each other about vertical and horizontal pivot axes when traveling over rough terrain, or the like.

More specifically, but without restriction to the particular use which is shown and described, the present invention relates to a hitch construction for use in connecting a two wheel draft unit and a trailer unit of the type employed in earth moving operations, such as, a rock wagon, or a scraper for handling earth materials, where it is necessary to transport such materials substantial distances over rough terrain.

Earthmoving or construction equipment of the wheeled type has distinct advantages over other types, such as crawler type tractors and the like, because of the higher speed of operation which is possible. However, the higher speed operation imposes severe stresses for protracted periods on the mechanism connecting the vehicles and suitable hitch constructions must be provided which are capable of withstanding the stresses. It is desirable, therefore, to provide a rugged hitch connection of relatively simple construction which is capable of easy assembly and continuous operation over long periods under heavy load conditions without excessive wear or breakage.

Hitch constructions heretofore provided for connecting vehicles of this type have comprised mountings on the rear of the tractor unit and the forward portion of the trailer unit. A vertical connecting or hitch pin, which will allow relative movement about a common vertical axis, has been mounted in the rearward portion of the tractor unit frame structure, enabling the connection to be made by inserting the hitch pin in a cooperating bearing assembly provided in the gooseneck or other forward portion of the trailer unit. Such hitch connection also provides for tilting movement of the hitch pin mounting about an axis extending in a generally horizontal plane and longitudinally of the tractor unit. With such an arrangement, the connection extends to a relatively high level on the rear of the tractor, and fluid conduits connecting between the trailer unit and the tractor unit to enable the operator to control the movement of the trailer unit in a safe and convenient manner, are exposed at a high level above the tractor frame which renders them especially vulnerable to accidental damage and interfere with an operator's line of vision.

SUMMARY OF THE INVENTION

It is, therefore, an object of the present invention to improve hitch construction for connecting articulated vehicles which has placement and mounting advantages not heretofore found in constructions for this purpose.

Another object of the invention is to provide in a hitch construction for connecting articulated vehicles an arrangement of the vertical hitch pin and the associated mountings for the same which enables the hitch pin to be lowered into the frame of the draft vehicle to a point where the maximum twisting leverage is less than in other available hitch arrangements.

A further object of the invention is to secure a vertical hitch pin in depending relation in a forward portion of a trailer structure which is to be connected to a tractor unit and provide at the rear of the tractor unit a cooperating hitch assembly which includes a vertical pin socket for rotatably securing therein depending portions of the vertical hitch pin and which is mounted in the tractor frame for lateral tilting movement.

These and other objects are attained in accordance with the present invention wherein there is provided a base portion of a vertically disposed hitch pin so secured that it is in depending relation in the forward portion of a trailer unit and providing a horizontal pivot assembly in the rear frame portion of a tractor with a vertically extending socket for rotatably receiving the vertical hitch pin so that the pin is at a low level relative to the tractor frame and the horizontal pivot axis.

DESCRIPTION OF THE DRAWINGS

Further objects of the invention, together with additional features contributing thereto and advantages accruing therefrom, will be apparent from the following description of a preferred embodiment of the invention which is shown in the accompanying drawings wherein like reference numerals indicate corresponding parts throughout, wherein:

FIG. 2 is a plan view showing the top of the hitch construction; and

FIG. 3 is a cross sectional view taken on line 3—3 of FIG. 2 to an enlarged scale.

DESCRIPTION OF A PREFERRED EMBODIMENT

Figure 1:
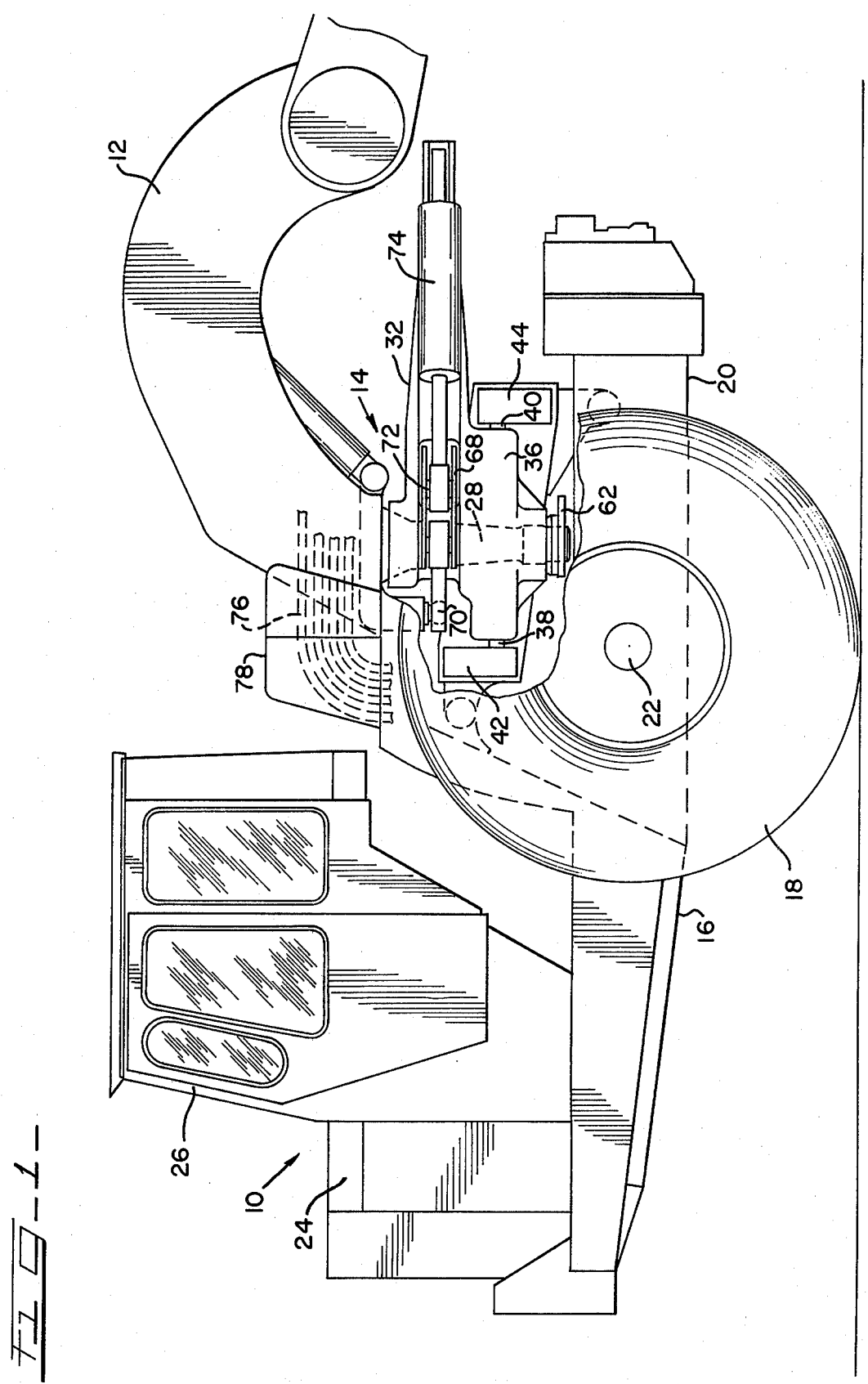
FIG. 1 is a side elevational view showing a two wheeled tractor unit with the gooseneck portion of a trailer unit connected thereto by a hitch construction embodying the invention, a portion of the wheel being cut away so as to expose details of the hitch construction.

Referring first to FIG. 1 there is illustrated a tractor unit 10 and the gooseneck portion 12 of a trailer unit (not shown) which is connected to the tractor unit 10 by a hitch construction 14 which embodies the principle features of the invention.

The tractor unit 10 comprises a frame structure 16 supported by a pair of transversely spaced ground engaging drive wheels 18. At the rear end of the tractor frame 16 there is an auxiliary housing 20 extending rearwardly of a rear portion of the frame, the foward portion of which is formed as a gear housing and in the sides of which the wheel axle 22 is journaled. An engine (not shown) is mounted on the forward portion of the frame 16 and enclosed by a hood 24. An operator's seat, steering wheel and associated controls for operation of the vehicle are enclosed in a cab structure 26.

The trailer unit is provided with a split gooseneck 12 (FIG. 2) at the forward end of which a king pin member 28 is secured in depending relation which is adapted to be rotatably received in a cooperating bearing socket 30 in the horizontal pivot assembly 32. With this type connection the traction wheels 18 of the tractor 10 support a portion of the trailer unit and its load. The two wheeled tractor is in a stable condition only when the trailer unit is connected to it through the gooseneck 12 and the hitch assembly 14.

The hitch assembly 14 comprises a body forming casting 34 having a lower portion 36 which forms a horizontal pivot member and a forward portion which forms the bearing socket 30 for the vertically disposed pin member 28. The horizontal pivot forming portion 36 is provided with axially aligned pivot pin portions or members 38 and 40 which are received in axially aligned bearing forming members 42 and 44 spaced longitudinally of the tractor frame 16. The pivot pin members 38 and 40 and the cooperating bearing forming members 42 and 44 may be constructed and assembled in the manner shown or as described in my U.S. Pat. No. 3,348,888 granted Oct. 24, 1967 so as to enable pivoting of the member 34 about an axis extending longitudinally of the frame 16.

The vertical pin socket 30 has enlarged diameter bores 46 and 48 at the top and bottom. At the top of bearing ring 50 is seated in the enlarged bore portion 46 which has an upwardly and outwardly tapering inner surface 52 for engagement with the tapered surface 54 of the base portion 55 of the pin member 28. At the bottom a bushing 56 is keyed or otherwise secured on the bottom end of the shaft forming pin portion 57, which is rotatably engaged with a bearing ring member 58 seated in the enlarged bore portion 48. The bushing 56 is secured axially by a washer 60 and a locking member 62, which secures the pin 38 in the socket 30. The base portion 55 of the pin 28 is of relatively short axial extent while the shaft forming portion 57 is of substantially larger axial extent so that the bearing areas are axially spaced a substantial distance, the top one being above the horizontal pivot axis and the bottom one below the same. The pin 28 is set so that its center in the vertical direction is a relatively short distance above the horizontal pivot axis and the lever arm, through which lateral twisting forces are transmitted, is relatively short, resulting in a more compact connection with the tractor 10.

The vertical pin 28 depends from an end plate portion 64 on the gooseneck which has a downturned edge or marginal portion 66 on the forward margin. On the bottom face of the forward flange portion 66 one end of right and left hand linkages 68 (FIG. 2) are secured by ball and socket connections 70. The linkages 68 are each pivotally connected at 72 to the forward ends of the operating pistons of right and left hand steering cylinders 74 so as to enable the operator to control the direction of transitional movement of the trailer relative to the tractor, through operation of the steering cylinders 74. A plurality of fluid conduits or hoses, indicated at 76, arise from the frame 16 beneath a guard plate or housing 78 and are turned across the end plate portion 74 of the gooseneck 12 to supply fluid to actuators on the trailer for permitting an operator on the tractor 10 to control functions of the trailer. The low disposition of the vertical pin 28 enables the conduits 76 to be kept at a low elevation where they have maximum protection against damage.

The hitch is readily assembled and disassembled. The vertical hitch pin 28 is held in the cooperating socket 30 by the retaining members 60, 62 and removal of these members will release the bushing 56 for removal axially of the pin end which frees the hitch pin 28 for removal from the socket 30.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for connecting tractor and trailer units or similar articulated vehicles which enables limited lateral tilting and horizontal angling of the units relative to each other about horizontal and vertical axes, said apparatus comprising means forming an elongate horizontal pivot member mounted in spaced bearing members for lateral tilting movement, said spaced bearing members being supported on a rear frame portion of said tractor unit, said bearing members being arranged to provide a horizontal pivot axis constituting an axis of rotation for said pivot member forming means which extends at a low level relative to said rear frame portion of said tractor unit, said pivot member forming means having a socket formation extending in a vertical plane through the axis of rotation of said means, a vertical pivot pin secured in depending fixed relation on a member on said trailer unit which extends forwardly of said trailer unit and which is positioned in overlying relation to said rear frame portion of said tractor unit, said vertically disposed pivot pin having a base portion of relatively short axial extent secured in depending relation on said forward portion of said trailer unit and a shaft forming portion of substantially greater axial extent seated in rotatable relation in said socket formation, and said pivot pin and said socket formation being arranged so as to support said pivot pin and to provide for rotation of said pivot pin on a vertical pivot axis.

2. An apparatus as set forth in claim 1 wherein said socket formation is of substantial vertical dimension and wherein bearing members are provided at the top and bottom ends of said socket formation which are adapted to rotatably support therein said vertical pivot pin.

3. An apparatus as set forth in claim 2 wherein said bearing members at the top and bottom ends of said socket formation are located above and below the axis of rotation of said horizontal pivot member, respectively.

4. An apparatus as set forth in claim 1 wherein said shaft forming portion of said vertical pivot pin is of sufficient axial extent to position the lowermost end thereof below the axis of rotation of said horizontal pivot member, when said pivot pin is seated in said socket formation with the base portion thereof positioned a short distance above said axis of rotation.

5. An apparatus as set forth in claim 1 wherein said socket formation is provided at its top and bottom ends with bearing forming members, said base portion of said vertically disposed pivot pin is seated in the bearing forming member at the top of said socket formation and said shaft forming portion having bearing engaging means on its lower end which is seated in the bearing forming member at the bottom end of said socket formation.

6. An apparatus as set forth in claim 5 wherein said vertically disposed pivot pin portions and said bearing engaging means are arranged to enable vertical separation from said socket formation in an upward direction of said pivot pin, and removable securing means on the bottom end of said pivot pin for preventing upward movement of said pivot pin relative to said socket formation while permitting rotation of said pivot pin about its vertical axis.

* * * * *